(12) United States Patent
Agarwal et al.

(10) Patent No.: US 12,423,434 B2
(45) Date of Patent: Sep. 23, 2025

(54) ON-DEMAND AND SECURE HARDWARE LICENSE-BASED SKU CREATION FOR ASICS

(71) Applicant: Cisco Technology, Inc., San Jose, CA (US)

(72) Inventors: Sachin Agarwal, Fremont, CA (US); Srirajkumar Sundararaman, San Jose, CA (US); Aviran Kadosh, Moreshet (IL); Samir Valjibhai Rajgor, Santa Clara, CA (US); Chirag Shroff, Cary, NC (US); Kevin Shyh-Kang Chang, Saratoga, CA (US); Dylan Walker, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 111 days.

(21) Appl. No.: 18/239,607

(22) Filed: Aug. 29, 2023

(65) Prior Publication Data

US 2024/0184890 A1     Jun. 6, 2024

Related U.S. Application Data

(60) Provisional application No. 63/430,131, filed on Dec. 5, 2022.

(51) Int. Cl.
    *G06F 15/177*      (2006.01)
    *G06F 21/44*       (2013.01)
    (Continued)

(52) U.S. Cl.
    CPC ............ *G06F 21/575* (2013.01); *G06F 21/44* (2013.01); *G06F 9/4401* (2013.01)

(58) Field of Classification Search
    CPC .............................. G06F 21/575; G06F 21/44
    (Continued)

(56) References Cited

U.S. PATENT DOCUMENTS

| | | | |
|---|---|---|---|
| 8,473,754 B2 | 6/2013 | Jones et al. | |
| 10,193,694 B1 * | 1/2019 | Guditz | .................. H04L 9/006 |

(Continued)

FOREIGN PATENT DOCUMENTS

| | | |
|---|---|---|
| EP | 3772008 A1 | 2/2021 |
| WO | WO2022256771 | 12/2022 |

OTHER PUBLICATIONS

PCT Search Report and Written Opinion mailed Mar. 19, 2024 for PCT Application No. PCT/US2023/082503 from PCT Summary, 32 pages.

(Continued)

*Primary Examiner* — Volvick Derose
(74) *Attorney, Agent, or Firm* — Lee & Hayes, P.C.

(57) ABSTRACT

A method of operating a system-on-chip (SOC) including decrypting, by isolated Root of Trust (RoT) code, a Stock Keeping Unit (SKU) license code from a host during bootup of a device. Then validating, by the isolated RoT code, the SKU license code with firmware and at least one built-in key of a plurality of built-in keys from secure storage. Finally, enabling or disabling, by the isolated RoT code, at least one feature set of a plurality of feature sets comprising resources configured at the SOC based on at least one SKU license code which has been decrypted by isolated RoT code using at least one built-in key and authenticated by firmware.

19 Claims, 10 Drawing Sheets

(51) Int. Cl.
*G06F 21/57* (2013.01)
*G06F 9/4401* (2018.01)

(58) Field of Classification Search
USPC .............................................................. 713/2
See application file for complete search history.

(56) References Cited

U.S. PATENT DOCUMENTS

| | | | | |
|---|---|---|---|---|
| 11,727,116 | B2 * | 8/2023 | Shah | H04L 9/3268 |
| | | | | 713/2 |
| 2010/0235921 | A1 * | 9/2010 | Foster | G06Q 20/3829 |
| | | | | 713/150 |
| 2013/0080764 | A1 | 3/2013 | Khosravi et al. | |
| 2013/0291070 | A1 * | 10/2013 | Triantafillou | H04L 63/08 |
| | | | | 726/4 |
| 2015/0170443 | A1 * | 6/2015 | Bower | G06F 21/105 |
| | | | | 340/5.6 |
| 2017/0078105 | A1 * | 3/2017 | Poulard | H04L 9/3278 |
| 2019/0356529 | A1 * | 11/2019 | Gulati | H04L 9/0897 |
| 2021/0012445 | A1 * | 1/2021 | Bartfai-Walcott | ............ |
| | | | | G06Q 20/1235 |
| 2021/0328853 | A1 | 10/2021 | Gulati | |
| 2022/0021540 | A1 * | 1/2022 | Sood | H04L 9/3234 |
| 2022/0067127 | A1 * | 3/2022 | Covolato | G06F 21/44 |
| 2022/0237333 | A1 * | 7/2022 | Peng | G06F 21/76 |
| 2022/0365770 | A1 | 11/2022 | Vrooman et al. | |
| 2022/0382866 | A1 | 12/2022 | Shroff et al. | |
| 2022/0382867 | A1 | 12/2022 | Shroff et al. | |
| 2022/0382912 | A1 | 12/2022 | Shroff et al. | |
| 2022/0385462 | A1 | 12/2022 | Shroff et al. | |
| 2023/0394154 | A1 * | 12/2023 | Gowda | G06F 21/50 |
| 2024/0106839 | A1 * | 3/2024 | Smith | H04L 63/1441 |

OTHER PUBLICATIONS

Pearson Bryan et al: "On Misconception of Hardware and Cost in IoT Security and Privacy", ICC 2019-2019 IEEE Internationalconference on Communications (ICC), IEEE, 0 May 2019 (May 20, 2019), pp. 1-7, XP033581589, DOI: 10.1109/ICC.2019.8761062[retrieved on Jul. 12, 2019]p. 3 Form PCT/ISA/210 (continuation of second sheet) (Apr. 2005).

* cited by examiner

ON-DEMAND AND SECURE HARDWARE LICENSE-BASED SKU CREATION FOR ASICS

RELATED APPLICATIONS

This application claims priority to Provisional Patent Application No. 63/430,131, filed on Dec. 5, 2022, the entire contents of which are incorporated herein by reference.

TECHNICAL FIELD

The present disclosure relates generally to chip based security. Specifically, the present disclosure relates to systems and methods for using a root-of-trust for constraining or enabling chip functionalities.

BACKGROUND

An application-specific integrated circuit (ASIC) generally refers to an integrated circuit designed for a specific purpose. An ASIC tends to be quite efficient at performing the specific purpose for which it was designed as opposed to general-purpose circuits, like General Processing Units (GPUs) or Central Processing Units (CPUs), which can perform many different functions, but often less efficiently. A product may include a number of ASICs. As one example, the product could be a switch or a router that includes different ASICs to support different protocols. Other ASICs could be included for other purposes.

To prevent attacks, a private key is placed in a nonvolatile electrically erasable programmable read-only memory (EEPROM) (or battery-backed static random-access memory (SRAM)) and uses hardware cryptographic operations such as digital signatures or encryption. The nonvolatile memory is often vulnerable to invasive attack mechanisms. The protection against such attacks may require the use of active tamper detection/prevention circuitry which must be continually powered.

Different types of device tampering may occur and include attempts to unauthorizedly modify a device's capability from a lower-end product to a higher-end product, and or gain the unlawful possession of a device from a manufacturer to circumvent sales channels to sell or resell it to the customer at a lower price. Maintaining the authenticity of a device is vital for customer assurance and to ensure the reliability of the device itself. For example, a device may be used to support critical network functions such as in power grid applications requiring an expected guaranteed level of performance. The unauthenticated device can be susceptible to security intrusions that can degrade the device's performance and may result in network outages. Other examples caused by an unauthenticated or counterfeit device are operational issues at customer ends that can result from software updates during a device's lifecycle, and which can also negatively and unfairly affect a vendor's reputation.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
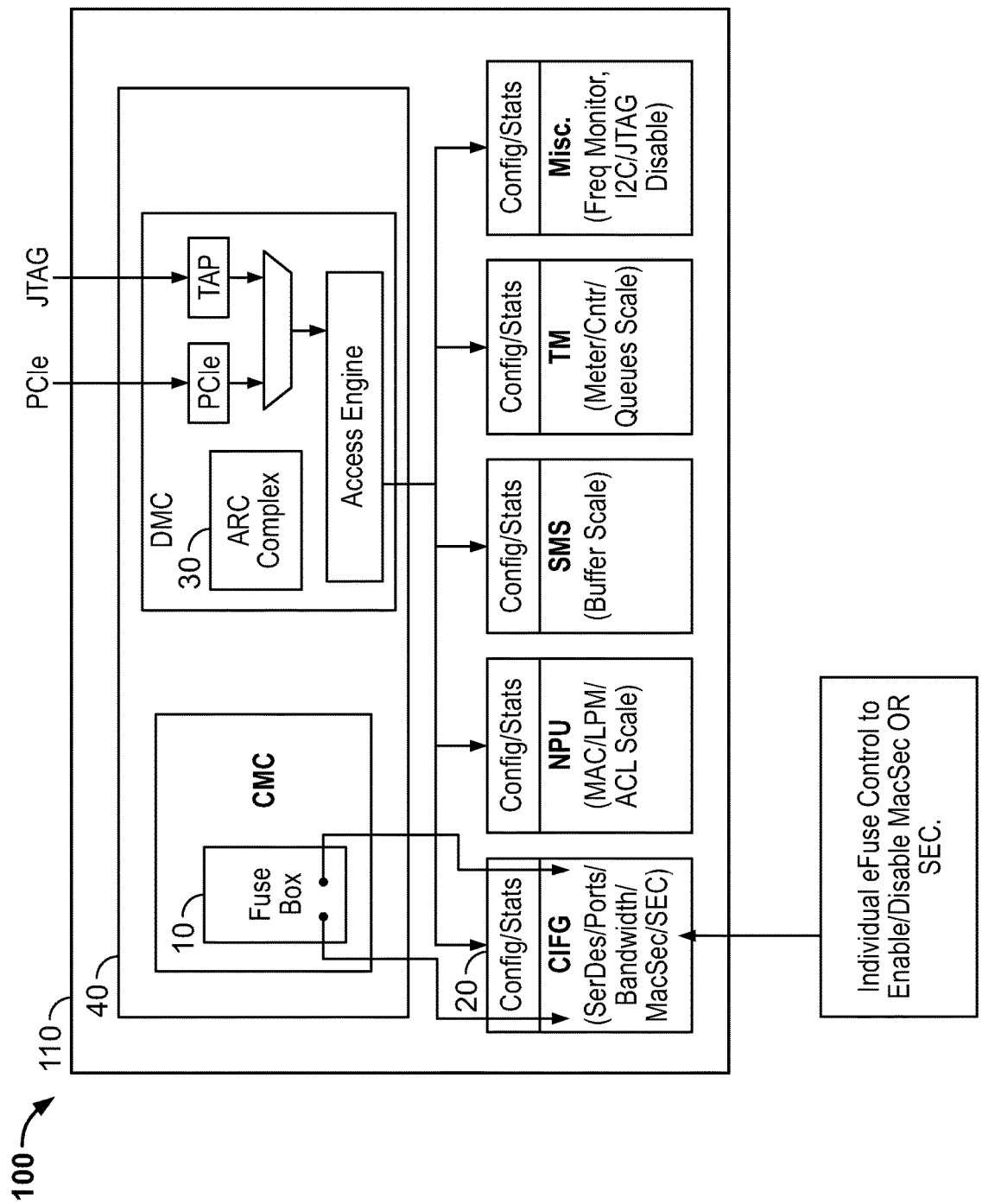
FIG. 1 illustrates different configurations of electrically programmable fuse (eFuse) controls that enable or disable Media Access Control security (MacSec) or Security (Sec) of the system-of-chip (SOC) according to some embodiments

This disclosure describes techniques for implementing on-demand and secure hardware licensed-based stock-keeping unit (SKU) configuration for Application Specific Integrated Circuits (ASICs). In some embodiments, one or more methods may be established for building features of an ASIC by utilizing a Root of Trust (RoT) code in a zero-trust environment of a device, for securely configuring the ASIC based on one or more licensed SKU codes. For example, The RoT code may receive an SKU licensing code from a host during bootup or may be configured one time as part of authenticated RoT forward (firmware) image. The firmware with the RoT code may then validate the incoming SKU licensing code with built-in keys from a secure storage such as a fuse box. The RoT code may configure a set of on-chip resources to achieve a desired SKU licensing (e.g., it may disable hardware-accelerated crypto so that licensed SKU code-based ASIC can be exported), and the RoT code may continue or periodically monitor and enforce the SKU characteristics of the ASIC operations (i.e., enforce licensed SKU bandwidth, and/or enable/disable crypto acceleration). In some embodiments, the evaluation of the license and enforcement occurs using the same isolated trusted code segment where a passive device evaluates the license with usage and operates an operating system (OS).

In some embodiment, the RoT code is implemented to enforce in the hardware of a system-on-chip, the licensed SKU using cryptographic controls. For example, the same die or package containing the ASIC and/or system-of-chip are controlled by eFuses that are burnt during the manufacturing process of the die. The eFuses may be configured to contain different part numbers and/or other part-specific identifiers (customer ID or versions) to enable or disable resources for one or more feature sets of each ASIC or system-of-chip configuration. For example, the features of a feature set are controlled by the CPU-specific RoT and firmware with an authentication built-in key that is securely stored. The features are controlled by eFuses by physically disabling features of the ASIC or system-of-chip without software. This enables different ASIC packages to be used based on each SKU.

Additionally, the techniques described in this disclosure may be performed as a method and/or by a system having non-transitory computer-readable media storing computer-executable instructions that, when executed by one or more processors, perform the techniques described above.

EXAMPLE EMBODIMENTS

In the examples described herein, a hardware root-of-trust (HWRoT) may be enabled without a trusted platform (TPM) where the HWRoT implements features of the SOC using an SKU and eFuse built-in keys. The licensed SKU ASIC may be enabled with the RoT which is equipped in the chip with an internal HWRoT. The HWRoT uses a read-only platform with programmed read-only cryptographic keys for enabling features such as a secure boot with firmware.

In some embodiments, the same package is used with different SKUs. For example, the eFuse mechanism is associated with different part numbers and is used by the SKU to enable feature sets.

In some embodiments, to prevent attacks, physically unclonable functions (PUFs) primitive may be used for authentication and secret key storage without requiring secured EEPROMs and associated costly hardware. This is possible because instead of storing codes in the digital memory, PUFs derive a secret from the physical characteristics of the integrated circuit (IC).

In some embodiments, enforcement of the SKU is enabled in hardware using cryptographic controls, where the same package (e.g., the package doesn't change with SKUs) features that are controlled by the SDK uses eFuse containing different part numbers and/or other means (like customer ID or version) to enable the features (which is more secure than using a Software Development Kit (SDK) to configure the keys). The features are controlled by the eFuses by physically disabling the features without software which is secure (though may be deemed less flexible). The features are controlled by the RoT and the firmware with an authenticated feature key (that is both secure and flexible), and different packages are used based on individual SKUs (i.e. more like binning, partial goods, combination, etc.).

In some embodiments, eFuses, a True Random Number Generator, and CPU (e.g., ARC®) complex with ROM are configured to secure the licensed SKU code.

In some embodiments, device-tracking can be enabled with the Root of Trust (RoT) in silicon devices. The RoT is at no time turned off and operates in a zero-trust environment (i.e. in an isolated RoT CPU complex contained in the ASIC). The ASIC Root-of-Trust assists in generating a random key that is both unique and device-specific and can be used to authenticate the device during the device power-up. The process flow also entails enabling an eFuse mechanism with a true random number generator (TRNG) based mechanisms to generate unique and reproducible device-specific random numbers for crypto security encryption.

In some embodiments, the Root of Trust (ROT) is an isolated executable code within the ASIC that boots from immutable code in mask ROM and is cryptographically personalized to each ASIC and can prevent the ASIC from performing its core function (e.g., switching packets) until certain requirements are met. The RoT must be able to find and authenticate an issued identity in the form of an X.509 certificate, similar to a Secure Unique Device Identifier (SUDI) certificate in format but different in content. The ASIC identity rather than a system identity is stored in the ASIC's companion SPI flash. This is enabled so that if the ASIC is lost or stolen in the supply chain before it is mounted on PCBs and provisioned with identities, it still cannot be enabled (i.e. used by a counterfeiter). In some embodiments, the RoT code is configured to be able to verify that it is on the same PCBA as a Trust Anchor, and it was paired at the time of manufacture. This is achieved by the host software facilitating a challenge/response from the ASIC RoT to the system Trust Anchor module for the latter's SUDI certificate, which contains all ASIC ECIDs in the same system as provisioned during manufacturing, such that the ASIC RoT can authenticate it and subsequently extract the ECID from the SUDI cert to verify its consistency with its local ECID. If these two cryptographic checks pass, a Silicon ASIC with a RoT will be enabled to serve its core function.

In some embodiments, because the SoCs have built-in RoT functionality, that can be used to enable cryptography to evaluate itself in a required operability including what features it should constrain, etc. The RoT can control the ASIC functionality and can be used to constrain or enable ASIC functionalities based on SKU licensing codes. The RoT receives an SKU licensing code from a host or connected platform during boot-up, or the SKU license code is provisioned when the ASIC is shipped. The SKU licensing code is implemented during bootup and can be time or cycle-configured dependent on the requirements. In some embodiments, the SKU license code can be a one-time code that is used as part of the authentication or provisioning of the ASIC. For example, as part of the authentication ROT forward image. The RoT firmware can validate the code with built-in keys or can be configured to send a request to a third-party site for validation. The RoT during the bootup can automatically configure functions, parameters, and resources on the ASIC (i.e., the chip) to achieve the requirements of a particular SKU license.

In some embodiments, the RoT can include functions embedded such as a watchdog monitor or timer, to monitor operational characteristics of components enabled in the ASIC under the SKU license. Also, the RoT can disable functions in the ASIC based on the SKU license code. For example, the eFuse can be triggered by the RoT for the one-time disablement of functions. The RoT can control the processor throughput, for example, configure higher processing rates dependent on the jurisdiction of use, to abide by respect export regulations. In this case, using the RoT to enable enforcement from an isolated trusted code, is not susceptible to hacking or license subversion. Also, with the RoT, the same package can be used and is not required to be changed with different SKU license codes. The SDK can use eFuse with different part numbers that physically disable ASIC operational features, but this is less flexible than software that implements controls such as can be configured from the RoT and firmware with an authentication feature. Different packages based on different SKUs can also be implemented (i.e., an on-demand configured ASIC).

Examples described herein also provide a computing device that may include a CPU (e.g., ARC® processor) or ASIC which is isolated and secure non-transitory computer-readable media storing instructions of the RoT that when executed by the processor, cause the processor to perform several operations.

Turning now to the figures, FIG. 1 illustrates different configurations of eFuse controls that enable or disable MacSec or Sec of the SOC 40 in some embodiments. In FIG. 1, the eFuse mechanism 100 is shown which in an embodiment, is configured in a device 110 manufacturing and is used to establish the device 110 authenticity before traffic is initiated on the device. In some embodiment, the eFuse mechanism 100 is enabled to configure a chip-specific keying material package (CSKMP), that consists of generating device-specific and unique random numbers, that are kept encrypted and used as symmetric keys for device authentication. The device 110 specific keys are encapsulated in the CSKMP with vendor-provided public key and may be accessible by a vendor backend in a secured environment. The secure environment can include chip-specific databases that are used to create a chip-level identity information package (CLIIP). In some embodiments, the vendor backend will create a new certification for the device 110 used with a product identifier (Product ID (PID)). In some embodiments, the new certificate will be sent to device 110 and installed in FLASH memory integrated with the ASIC (i.e., CPU (or ARC® complex) 30) of device 110.

In some embodiments, the eFuse mechanism 100 can be implemented with a one-time programmable (OTP) to control the functionality of resources of the SoC 40. The eFuse mechanism 100 is programmed to contain one or more secure keys (i.e., built-in keys) contained in the fuse box 10 during manufacturing and not after production. The eFuse mechanism 100 can itself configure the control of the Media access control security (Mac Sec) for authentication and encryption of traffic over Ethernet on Layer 2 LAN networks (config/stats module 20). The eFuse mechanism can ensure that a secure boot mechanism starts its root of trust (ROT) by setting up one or more keys (i.e., a private-public key pair (asymmetric) or also 2 private keys (symmetric)) into the semiconductor device 110 during the manufacturing process of the chip vendor. In some embodiments, the ASIC (i.e., CPU complex 30) will use different authentication keys where a random number is generated from a true random number generator (TRNG) (non-NIST compliant) and is written in eFuses (i.e., the eFuse mechanism 100) with the assistance of firmware.

In some embodiments, other than the built-in keys, the eFuses can be configured to store device security related to control and status bits. These are optional and dependent on the firmware and whether it is required to use the other features.

Figure 2:
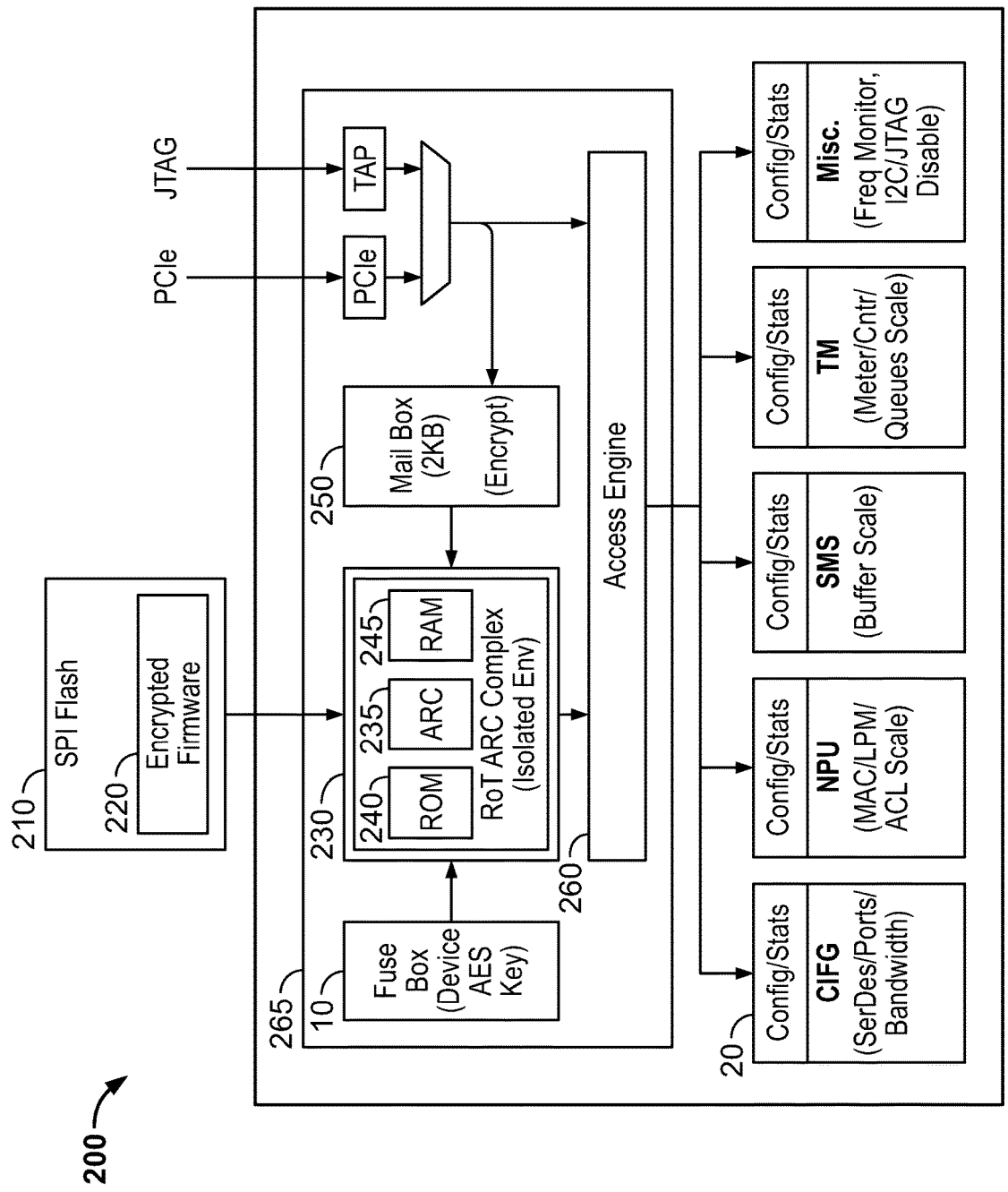
FIG. 2 illustrates a system architecture diagram of a Root of Trust (RoT) CPU complex that is isolated and encrypted to receive encrypted firmware and to program different feature sets of device configurations by the setting of eFuse controls to enable or disable MacSec/IP Sec according to some embodiments.

FIG. 2 illustrates a system architecture diagram of a Root of Trust (ROT) CPU complex that is isolated and encrypted to receive encrypted firmware and to program different device configurations based on the SKU and in accordance with setting configured with eFuse controls that enable or disable various MacSecs/Secs of the SOC or device.

As depicted in FIG. 2, an isolated Root of Trust (ROT) CPU Complex 230 is configured to operate in a zero-trust environment of device 200. In some embodiments, an isolated RoT CPU Complex 230 is configured that provides a security perimeter to protect the CPU processor (i.e., ARC® processor) 235, the ASIC, that runs secured firmware 220 in the runtime memory. In some embodiments, the firmware 220 is encrypted firmware configured with serial peripheral interface (SPI) Flash memory (e.g., the SPI flash can be used to store a bootable firmware and is explicitly accessible by sending commands from instructions configured in the RoT code). The RoT code may be input during the device manufacturing process and may include information from the digital birth certificate that enables the device 200 (i.e., device enablement information that has been previously programmed into a hardware component during the manufacture of the device 200).

The secure CPU processor 235 may be programmed so that information based on different licensed SKUs can be used for different packages of SOCs 265. The CPU processor 235 can include specific cryptographic and computational hardware to facilitate the processing of the cryptographic information (i.e., the different licensing SKU codes). The secure system (i.e., the isolated RoT CPU Complex 230) can configure the features of the (programmable) device 200 with RoT code executed in secure read-only memory (ROM) 240 and randomly accessible memory (RAM) 245 with the instructed CPU processor 235 accessing the built-in keys from secured storage of the fuse box 10 to create multiple final device 200 type configurations. Each of the final device 200 type configurations can be identified by a different stock-keeping unit (SKU) having different properties that are decrypted by the built-in keys.

In implementations, the RoT code can be configured to never be turned off as it operates in a zero-trust environment (i.e., the isolated RoT CPU Complex 230 and received keys eFused from the fuse box 10, and instructions from the mailbox 250 which are encrypted). The ASIC (CPU processor 235) Root-of-Trust can be configured to assist in creating a random key unique to device 200 that personalizes the device and authenticates the device 200 with the device power-up.

In some embodiments, the hardware Root of Trust (RoT) code is integrated into the monolithic silicon of the ASIC (CPU processor 235) and is an isolated execution environment within the ASIC that boots from immutable code in mask ROM (240), is cryptographically personalized to each ASIC, and will prevent the ASIC from performing its core function (e.g., switching packets) until two requirements are met. First, the RoT code must be able to find and authenticate an identity (e.g., a vendor-based identity) in the form of an X.509 certificate (or like certification), similar to a SUDI certificate in format but different in content in that this is an ASIC identity rather than a system identity and stored in the ASIC's companion Serial Peripheral Interface (SPI) Flash 210.

In some embodiments, the eFuse and a TRNG-based mechanism are implemented to create a unique and reproducible device-specific random number generator. The SPI Flash 210 may store the Secure Unique Device Identifier, or SUDI, which is an X.509v3 certificate that maintains the product identifier and serial number. The identity is implemented at manufacturing and is chained to a publicly identifiable root certificate authority. The CPU processor 235 in the isolated RoT CPU Complex 230 will enable CPU crypto hardware functions with crypto algorithms. SPI Flash 210 is used to store the intermediate firmware 220 states or control flags. A dedicated CPU Complex (i.e., the isolated RoT CPU Complex 230) is provided for device security (instead of reusing an existing CPU processor). In some embodiments, the CPU configuration will be the same as other CPU processors (of a device) along with dedicated ROM 240. This ROM 240 will contain SBOOT0 code and will be used to boot up (device-security) CPU processor 235. The device security of the CPU processor 235 is configured to execute security code and is secured from side-channel attacks such as through other interfaces to (1) either reset/halt the core or (2) or change the program pointer. Also, if needed the firmware 220 can be configured for control and statuses can be stored in a unified data repository or records (UDR) to prevent attacks.

In some embodiments, the SUDI certificate is encrypted with a chip-specific key and stored in SPI Flash 210. The firmware code is provided from SPI flash, which is authenticated first before use. In some embodiments, the implementation of device 200 is by authentication through mailbox 250 for some devices (devices without an SPI master interface).

Figure 3:
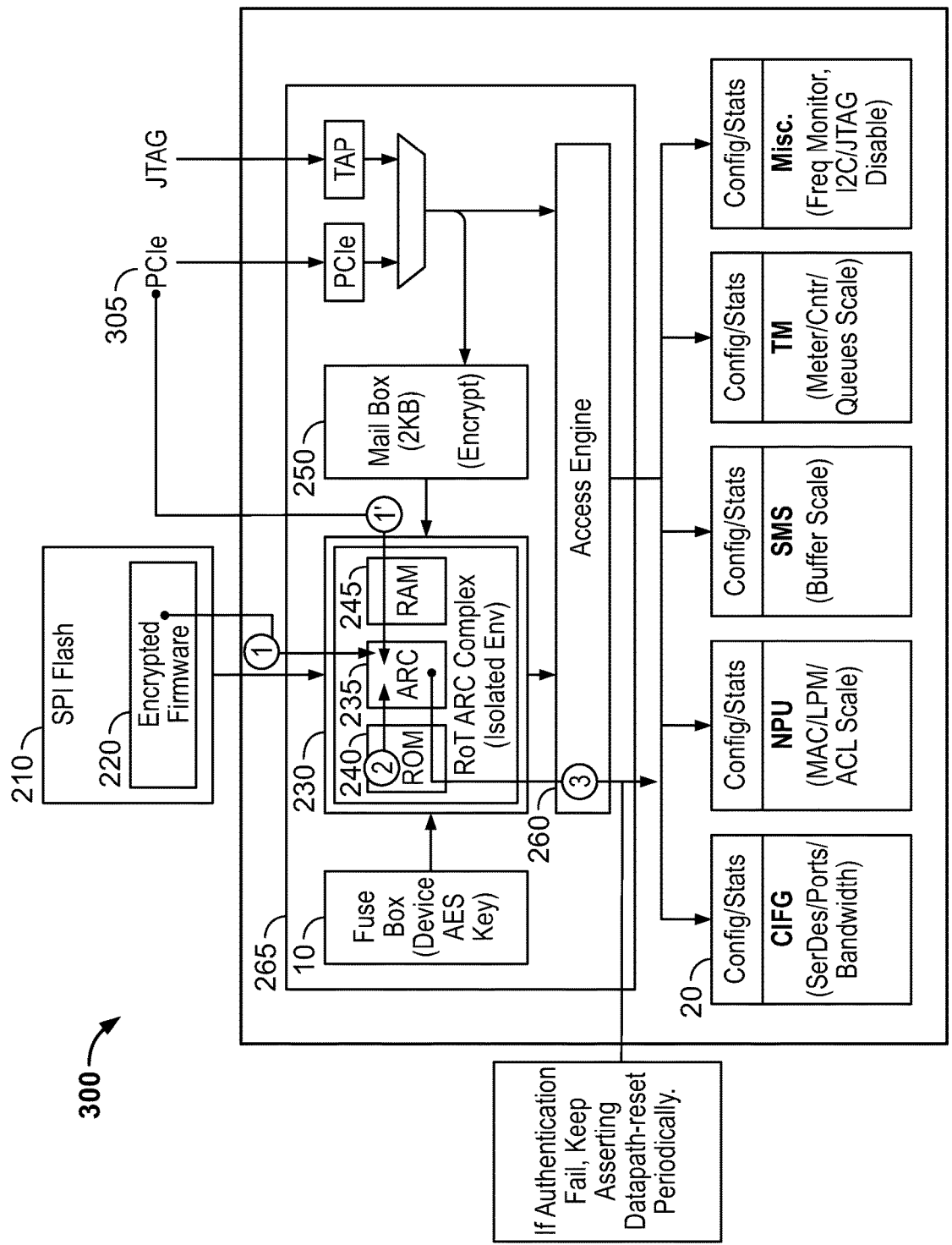
FIG. 3 illustrates a system architecture diagram that includes an authentication process for authenticating, by the RoT code, a device according to some embodiments

FIG. 3 includes an authentication process "(A)" for authenticating the device 300 according to some embodiments. In FIG. 3, at step 1, the peripheral connect interface express (PCIe) 305, or the firmware provides code for authentication before the device is enabled. In step 2, the built-in keys from the fuse box are read by the RoT, and then in step 3, the CPU processor 235 authenticates and decrypts the firmware code (from the encrypted firmware 220) from the SPI Flash 210 to execute the firmware code at the access engine. If this authentication fails, the RoT will reset the data path and retry the authentication operation periodically.

Figure 4:
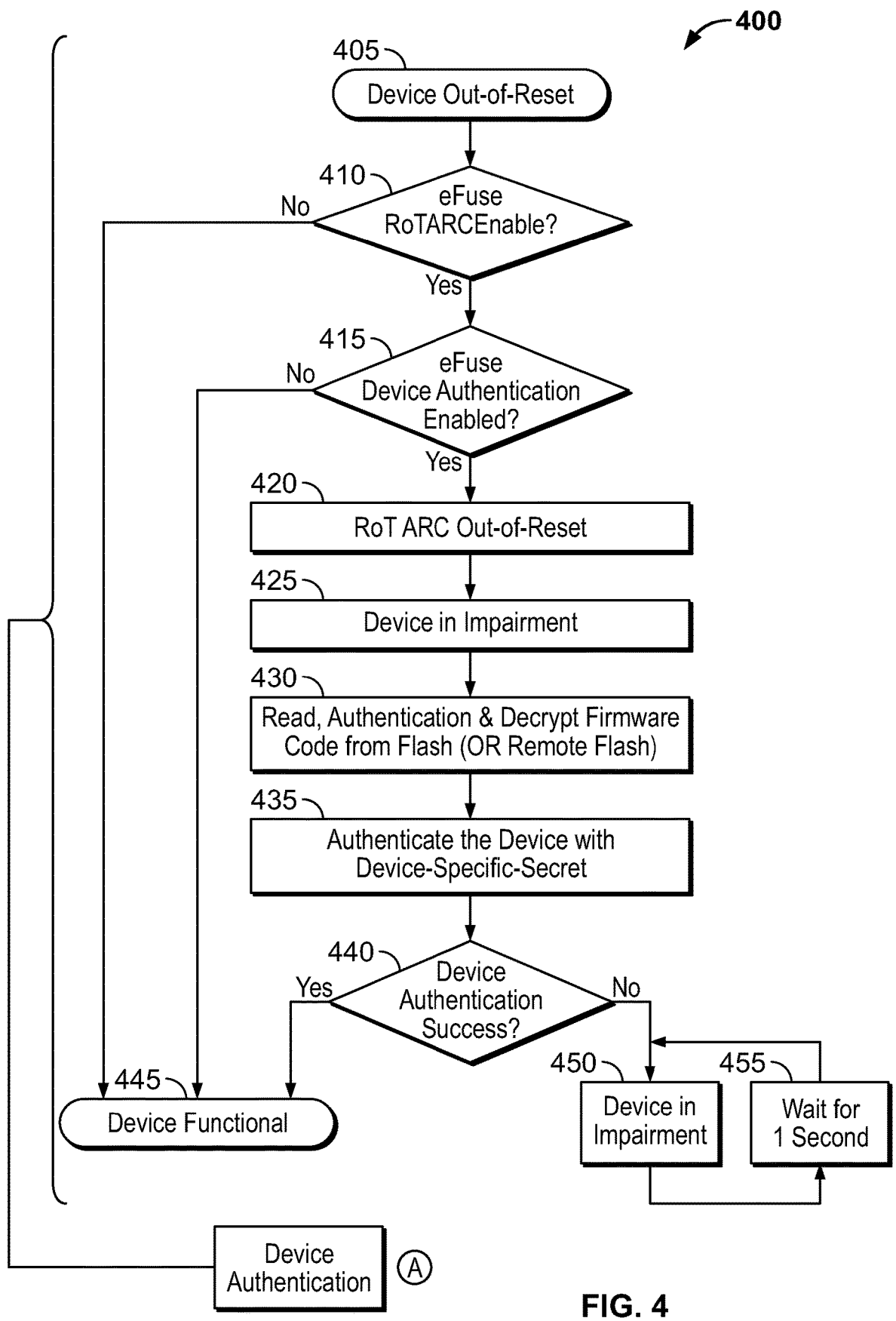
FIG. 4 illustrates a flow diagram of the authentication process in the diagram of FIG. 3 according to some embodiments.

FIG. 4 illustrates a flow diagram of the authentication process in FIG. 3 according to some embodiments. In FIG. 4, in process 400 for the device authentication, at step 405, device 200 is initially in an out-of-reset status. At step 410, the eFuse mechanism for the device authentication is enabled (i.e., the eFuse RoT CPU enable is enabled or not?). If the eFuse device authentication is enabled then at step 420, the RoT CPU is out of reset. At step 425, the device impairment is disabled or interrupted to allow for the device ATE/qualification access to be completed. At step 430, read, authenticate, and decrypt of firmware code from the Flash memory (or remote Flash memory) takes place. At step 435, the device is authenticated with the Device-Specific-Secret. At step 440, the device authentication is checked, if it is successful then at 445 the device is enabled, else at step 450, the device is placed in impairment, and a wait period 455 is triggered of about 1 second or other desired time period. If at step 410, the eFuse RoT CPU enabled is not enabled, or the eFuse device authentication is not enabled at 415, then the flow continues to step 445, and the device is functional.

Figure 5:
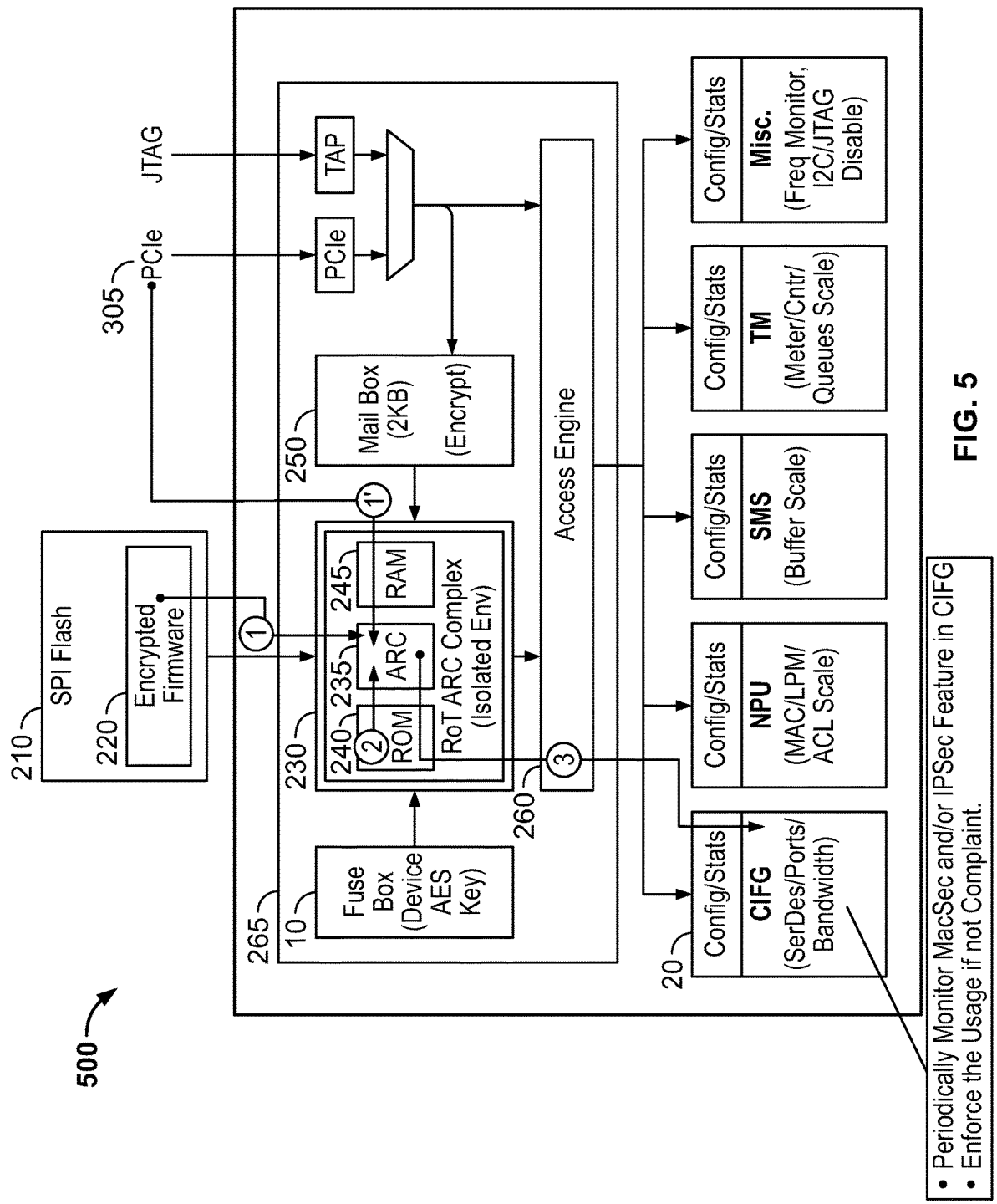
FIG. 5 illustrates a system architecture diagram of a device configured based on a licensed stock-keeping unit (SKU) code with a disabling crypto-disable license that is stored locally or received externally for selective processor-configured features/functions according to some embodiments.

FIG. 5 illustrates a device with SKUs and a disabling crypto-disable license stored locally or received externally for selective processor functions according to some embodiments. In FIG. 5, in the diagram of device 500, the CPU processor 235 is configured to receive crypto disable license that is stored in the SPI Flash 210 at step 1 and decrypt the crypto-disable license using built-in keys stored in the fuse box 10 (i.e., eFuse configured in manufacture) or at step 1' receive the crypto-disable license at Mailbox 250 sent from an external host via the PCIe 305. Once, the crypto-disable license is read using the built-in keys at step 2: the RoT instructs the CPU processor 235 at step 3, to selectively enable MacSec or IPsec via the activity engine 260, and periodically (or continually) monitor the config/stat in the CIFG and enforce usage if not compliant. In some embodiments, the SKUs are created with disabling features of the crypto for export requirements.

Figure 6:
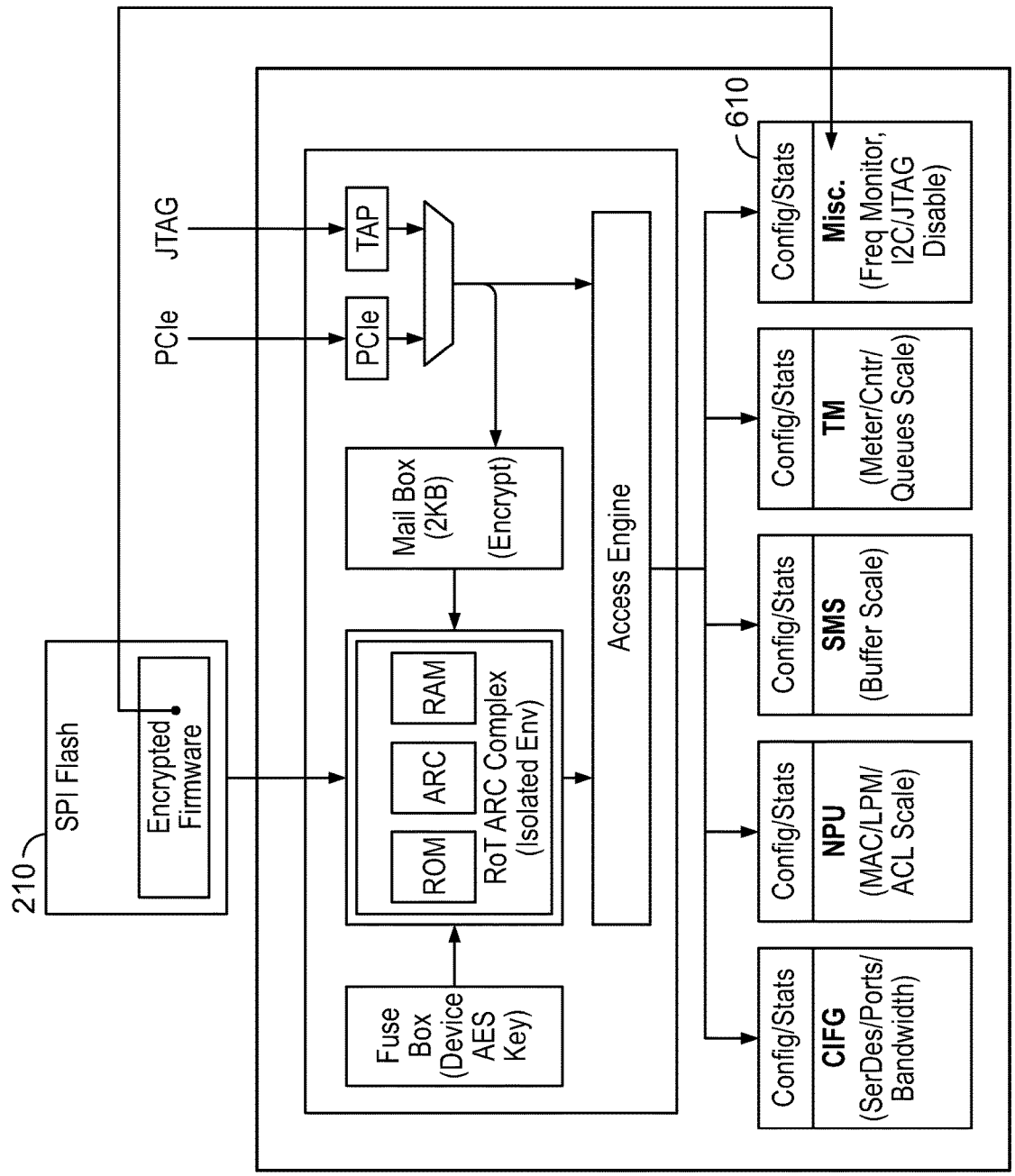
FIG. 6 illustrates a system architecture diagram of an on-demand configured device that enables a frequency control based on a licensed SKU code for a desired operating frequency of the device according to some embodiments.

FIG. 6 illustrates an on-demand exemplary model for device frequency control with SKUs for different operating frequencies of the device according to some embodiments. In FIG. 6, the SKUs derived by encrypted firmware (of the SPI Flash 210) for different operating frequencies of the device 200 (e.g., 250 MHZ, 500 MHZ, 1G) via config/stats 610 are enabled, and monitored to enforce the core frequencies chosen periodically.

Figure 7:
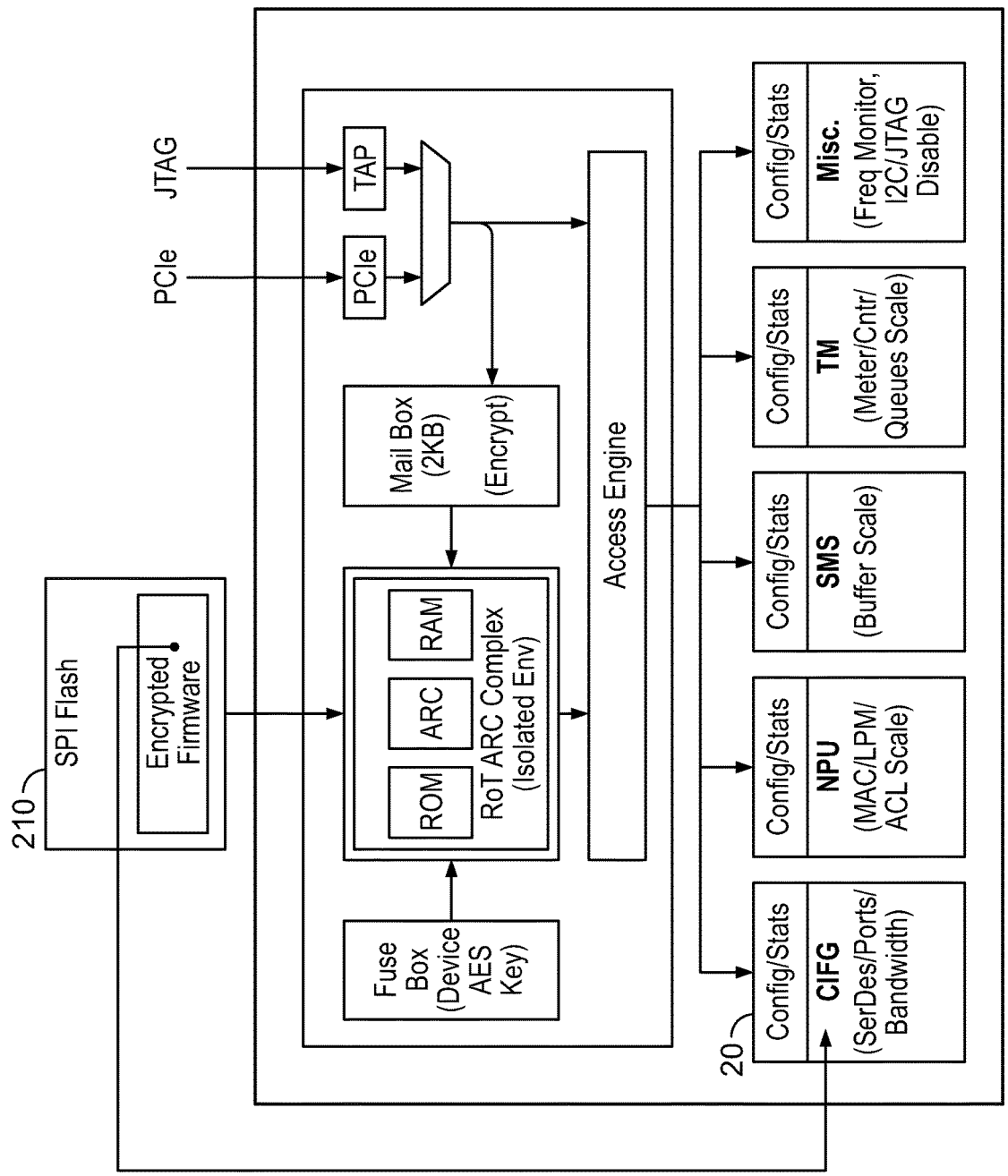
FIG. 7 illustrates a system architecture diagram of an on-demand configured device that enables port control based on a licensed SKU code for the desired numbers or configuration of ports and speed of a device according to some embodiments.

FIG. 7 illustrates an on-demand exemplary model for device port control with SKUs for different numbers of ports and the speed of the device according to some embodiments. In FIG. 7, the SKUs (enabled by the firmware from the SPI Flash 210) for the different number of ports and speeds (e.g., 10G, 25G, 50G, etc.) are periodically monitored and enforced for the intended use Serializer/Deserializer/Ports and speeds for each SKU via the config/stats 20.

Figure 8:
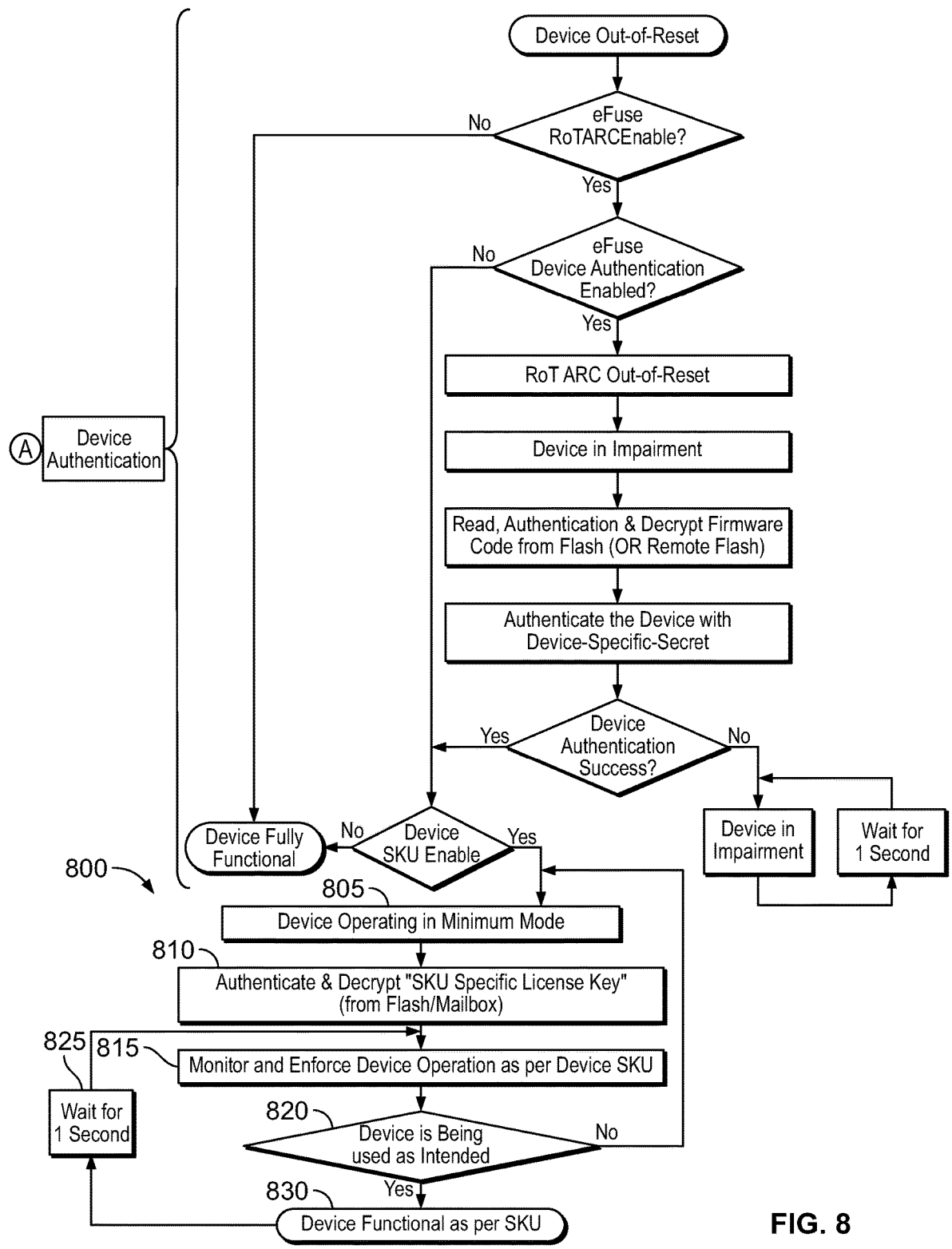
FIG. 8 illustrates an exemplary flowchart of a configured device based on a licensed SKU code, that is configured on demand using the authentication process of the diagram of FIG. 4, according to some embodiments.

FIG. 8 is an exemplary flow of the SKU on demand with the device authentication of FIG. 4 according to some embodiments.

In FIG. 8, the flow chart 800 illustrates a device 200 that is productized with multiple variations of a crypto feature enable, overall device throughput (operating frequency), number of ser/des/ethernet ports and speeds, and MAC/LPM/ACL queues, etc. . . . . The different SKUs that are enabled can be created with the device 200 and ASIC features enabled to provide feature variations that are decided on-demand without preplanning during the production, the delivery of authenticated and encrypted firmware code to enable/disable features even in a zero-trust environment, and the device variation on same ASIC in use without device changes. Since the eFuse is enabled for built-in key authentications, and not for controls, the eFuse-based controls are not used, and the ASIC features of the device can be implemented on demand. In FIG. 8, after the device is enabled and functional via the authentication "(A)" (See. FIG. 4), and can be considered a device SKU enabled, then at step 805, the device is placed in operation with a minimum mode of operation.

At step 810, an authenticate and decrypt operation is applied using an SKU-specific license key received from the SPI Flash 210. At step 815, the RoT monitors and enforces device operation as per the device SKU. The RoT determines at step 820 if the device is operating or used as intended if not then the flow reverts to reauthenticate the device. If it is (i.e., used as intended), then at step 830 the device is allowed to operate per the SKU, and after a period of time (i.e., at step 825, for 1 sec or other desired period), the device is monitored, and operation is enforced (cyclically) per its SKU. The cycle repeats as long as the device operates under the SKU. In this way, device security is achieved, and the SKU-specific operation is enabled without device tracking. Also, the SKU license-specific key can be sent through the PCIe which is locally stored on the customer's local host along with its SDK. Also, the SKUs can be enabled by enabling all the features without the need for SKU license-specific keys, an SKU license-specific key per device, and an SKU license-specific key per group of devices (e.g., per customer).

Figure 9:
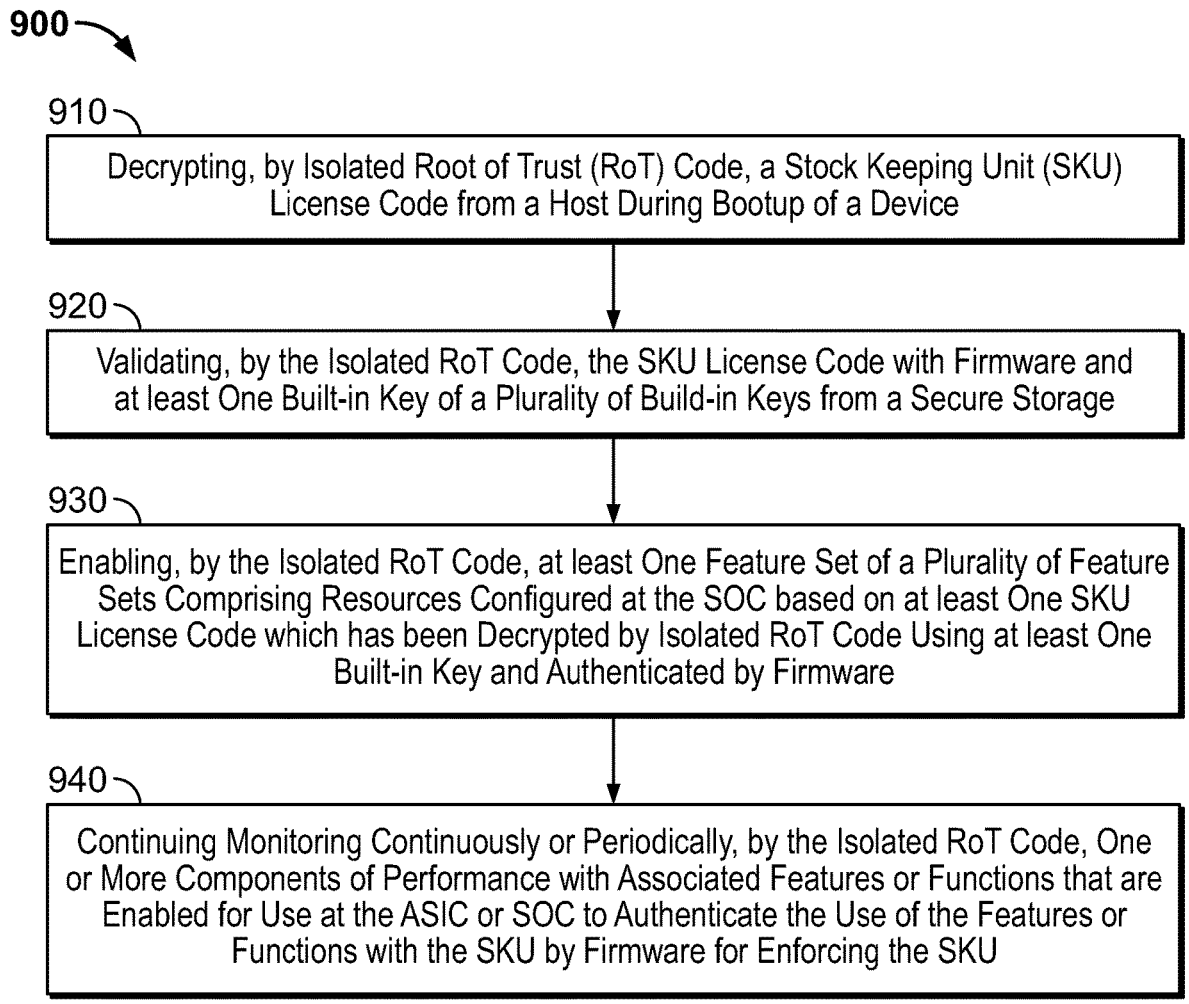
FIG. 9 illustrates an exemplary flowchart of an example method of the device authentication and on-demand configured device feature set based on a SKU according to some embodiments.

FIG. 9 is an exemplary flowchart 900 of an example method of a device feature set authentication and configuring on-demand SKU features using built-in keys according to some embodiments. At step 910, the example method for operating a system-on-chip (SOC) includes decrypting by a Root of Trust (RoT) code which is enabled in a zero trust or isolated environment of a RoT CPU complex, a Stock Keeping Unit (SKU) license code from a host during bootup of a device. The RoT code may also receive a one-time as part of authenticated RoT forward (FW) image. At step 920, the RoT validates the SKU license code with firmware and at least one built-in key of a set of built-in keys that have been configured in the manufacturing of the die using eFuses burnt to enable or disable features or functions of the ASIC and the built-in keys are encrypted in secure storage with various encryption methods. The secure storage may be a fuse box. At step 930, the RoT configures or enables on-chip resources which may include enabling one or more feature sets of different resources configured at the SOC or ASIC based on one or more SKUs which has been decrypted by the RoT in the isolated environment using at least one built-in key and authenticated by firmware. In implementations, the RoT configures on-chip resources to achieve the desired licensed SKU (e.g., disable hardware-accelerated crypto so that the SKU can be exported). At step 940, the RoT continues to monitor either continuously or periodically, one or more components of performance with associated features or functions that are enabled for use at the ASIC or SOC to authenticate the use of the features or functions with the SKU. In some embodiments, the RoT keeps on monitoring and enforcing the SKU characteristics (i.e., controls the throughput of the device). In some embodiments, the SKU license code enables one or more frequencies of a range of frequencies for operating the SOC, and/or enables one or more ports of a set of ports for operating the SOC. The SKU license code is locally encrypted and stored, and readable by the isolated RoT code with firmware stored in flash memory. Each built-in key has been configured by at least one electrical programmable fuse (eFuse) burnt in a manner to at least disable one or more features of the SOC.

Figure 10:
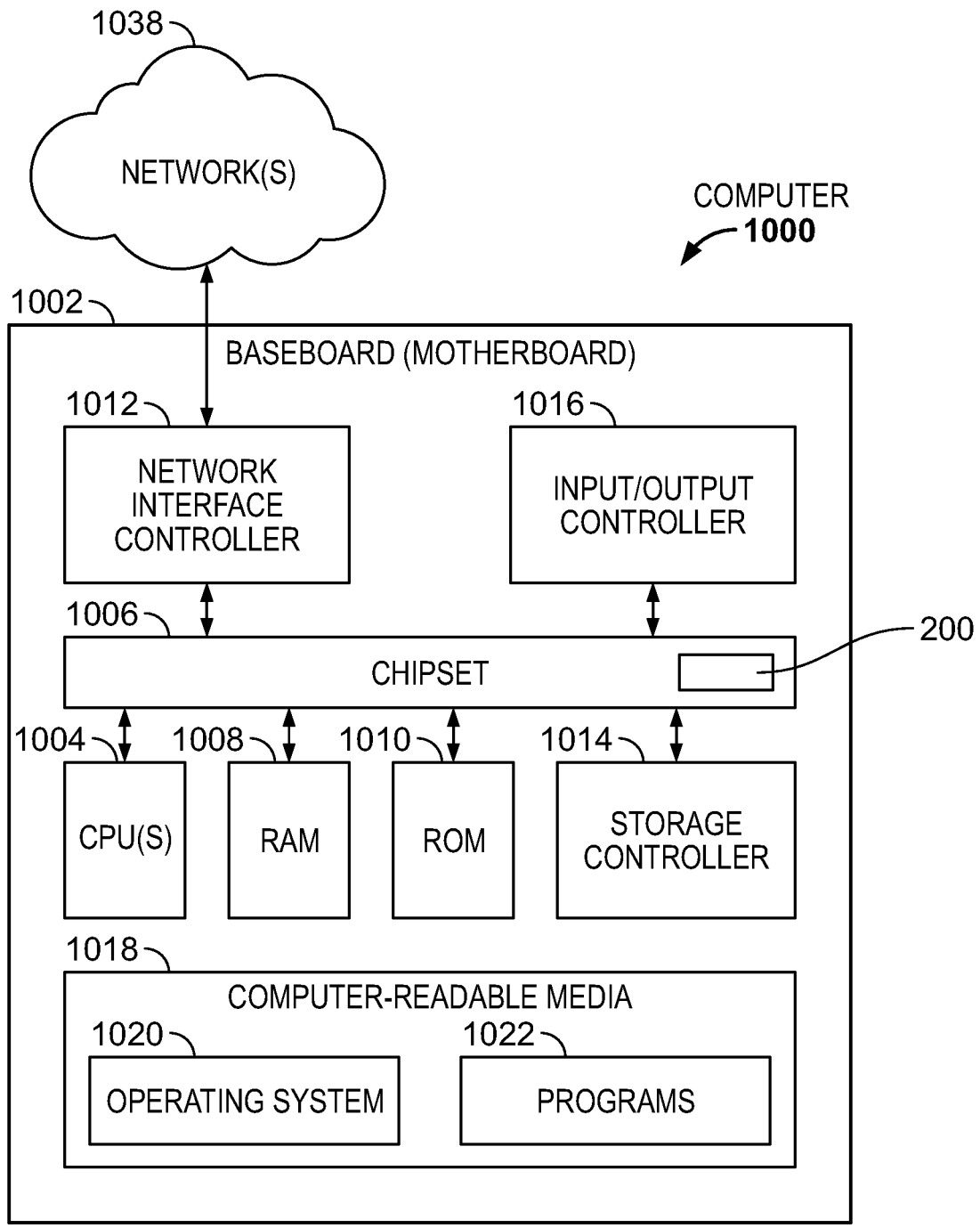
FIG. 10 illustrates a computer architecture diagram showing an example of computer hardware architecture for implementing a computer that has a chipset that integrates the isolated RoT CPU complex (i.e., the isolated environment) of FIGS. 2-3 and 6-8, and is utilized to implement aspects of the various technologies presented herein.

FIG. 10 illustrates a computer architecture diagram showing an example of computer hardware architecture for implementing a computer that has a chipset that integrates the zero-trust environment and is utilized to implement aspects of the various technologies presented herein. The computer hardware architecture with a computer 1000 connected to a network 1038 is shown in FIG. 10 with a chipset 1006 that incorporates or integrates the device 200 that includes the various elements of the isolated RoT CPU Complex 230 with the fuse box 10, the mailbox 250, the access engine 260, the CIFG 20, the SPI Flash 210 storing the encrypted firmware 220, and the other components described in FIGS. 1-3, and 5-7.

The chipset 1006 provides an interface between the CPU(s) 1004 and the remainder of the components and devices on the baseboard 1002. The chipset 1006 may provide an interface to a RAM 1008, used as the main memory in the computer 1000. The chipset 1006 may further provide an interface to a computer-readable storage medium such as read-only memory (ROM) 1010 or non-volatile RAM (NVRAM) for storing basic routines that help to startup the computer 1000 (and is separate from the ROM and RAM of the isolated RoT CPU Complex 230) and to transfer information between the various components and devices. The ROM 1010 or NVRAM may also store other software components necessary for the operation of the computer 1000 in accordance with the configurations described herein.

The computer 1000 includes a baseboard 1002, or "motherboard," which is a printed circuit board to which a multitude of components or devices may be connected by way of a system bus or other electrical communication paths. In one illustrative configuration, one or more central processing units (CPUs) 1004 operate in conjunction with a chipset 1006 and the device 200 including the isolated RoT CPU Complex 230, the fuse box 10, the mailbox 250, and the firmware 220 (i.e., components of the SOC 265). The CPUs 1004 may be a standard programmable processor that performs arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer 1000 may operate in a networked environment using logical connections to remote computing devices and computer systems through a network. The computer 1000 may be connected to a storage device 1018 that provides non-volatile storage for the computer. The storage device 1018 (separate from the secure storage (i.e., Fuse box 10, Mailbox 250) may store an operating system 1020, programs 1022 (e.g., any computer-readable and/or computer-executable code described herein), and data, which have been described in greater detail herein. The storage device 1018 may be connected to the computer 1000 through a storage controller 1014 connected to the chipset 1006. The storage device 1018 may consist of one or more physical storage units. The storage controller 1014 may interface with the physical storage units through a serial attached SCSI (SAS) interface, a serial advanced technology attachment (SATA) interface, a fiber channel (FC) interface, or another type of interface for physically connecting and transferring data between computers and physical storage units.

The computer 1000 may store data on the storage device 1018 by transforming the physical state of the physical storage units to reflect the information being stored. The specific transformation of the physical state may depend on various factors, in different examples of this description. Examples of such factors may include but are not limited to, the technology used to implement the physical storage units, whether the storage device 1018 is characterized as primary or secondary storage and the like.

For example, computer 1000 may store information the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer

1000 may further read information from the storage device 1018 by detecting the physical states or characteristics of one or more particular locations within the physical storage units.

In addition to the storage device 1018 described above, the computer 1000 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 1000

By way of example, and not limitation, computer-readable storage media may include volatile and non-volatile, removable, and non-removable media implemented in any method or technology. Computer-readable storage media includes but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 1018 may store an operating system 1020 utilized to control the operation of the computer 1000. According to one example, the operating system 1020 comprises the LINUX operating system. According to another example, the operating system comprises the WINDOWS® SERVER operating system from MICROSOFT Corporation of Redmond, Washington. According to further examples, the operating system may comprise the UNIX operating system or one of its variants. It may be appreciated that other operating systems may also be utilized. The storage device 1018 may store other system or application programs and data utilized by the computer 1000.

In one example, the storage device 1018 or other computer-readable storage media is encoded with computer-executable instructions which, when loaded into the computer 1000, transform the computer from a general-purpose computing system into a special-purpose computer capable of implementing the examples described herein. These computer-executable instructions transform the computer 1000 by specifying how the CPUs 1004 transition between states, as described above. According to one example, the computer 1000 has access to computer-readable storage media storing computer-executable instructions which, when executed by the computer 1000, perform the various processes described above with regard to FIGS. 1 through 9. The computer 1000 may also include computer-readable storage media having instructions stored thereupon for performing any of the other computer-implemented operations described herein.

The computer 1000 may also include one or more input/output controllers 1016 for receiving and processing input from a number of input devices, such as a keyboard, a mouse, a touchpad, a touch screen, an electronic stylus, or other type of input device. Similarly, an input/output controller 1016 may provide output to a display, such as a computer monitor, a flat-panel display, a digital projector, a printer, or other type of output device. It will be appreciated that the computer 1000 might not include all of the components shown in FIG. 10, may include other components that are not explicitly shown in FIG. 10, or might utilize an architecture completely different than that shown in FIG. 10.

The computer 1000 may include one or more hardware processor(s) such as the CPUs 1004 configured to execute one or more stored instructions. The CPUs 1004 may comprise one or more cores. Further, the computer 1000 may include one or more network interface controllers 1012 (with network interfaces) configured to provide communications between the computer 1000 and other devices, such as the communications described herein. The network interface controllers 1012 may be coupled with or include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

Program 1022 may comprise any type of program or process to perform the techniques described in this disclosure. Program 1022 may enable the devices described herein to perform various operations.

The examples described herein provide systems and methods that may utilize an isolated RoT code with built-on keys provided in a trust zone environment for authenticate and monitoring operations within the ASIC or SOC.

Clause 1. A method of operating a system-on-chip (SOC), comprising: decrypting, by isolated Root of Trust (RoT) code, a Stock Keeping Unit (SKU) license code from a host during bootup of a device: validating, by the isolated RoT code, the SKU license code with firmware and at least one built-in key of a plurality of built-in keys from a secure storage: and enabling or disabling, by the isolated RoT code, at least one feature set of a plurality of feature sets comprising resources configured at the SOC based on at least one SKU license code which has been decrypted by isolated RoT code using at least one built-in key and authenticated by firmware.

Clause 2. The method of clause 1, further comprising: monitoring, by the isolated ROT code, at least one component of performance of at least one feature set enabled to authenticate use of the SOC based on the at least one SKU license code.

Clause 3. The method of clause 1, wherein the at least one built-in key is configured by at least one electrical programmable fuse (eFuse) during a manufacture of the device.

Clause 4. The method of clause 1, wherein the at least one built-in key is based on at least one electrical programmable fuse (eFuse) to at least disable one feature set of the SOC of the device.

Clause 5. The method of clause 1, wherein the at least one feature set is created on demand at the SOC based on the at least one SKU license code received by the RoT code.

Clause 6. The method of clause 1, wherein the at least one SKU license code enables at least one frequency of a set of frequencies for operating the SOC.

Clause 7. The method of clause 1, wherein the at least one SKU license code enables at least one port of a set of ports for operating the SOC.

Clause 8. The method of clause 1, wherein the at least one SKU license code is locally encrypted and stored, and readable by the isolated RoT code with firmware stored in flash memory.

Clause 9. The method of clause 1, wherein the secured storage comprises a fuse box of encrypted built-in keys in which each built-in key has been configured by at least one electrical programmable fuse (eFuse) burnt in a manner to at least disable one or more features of the SOC.

Clause 10. A non-transitory computer-readable medium comprising an isolated Root of Trust (RoT) code storing instructions that, when executed, cause a processor to perform operations, comprising: decrypting a Stock Keeping Unit (SKU) license code from a host during bootup of a device: validating the SKU license code using firmware with at least one built-in key of a plurality of built-in keys stored at a secure storage: and enabling or disabling at least one feature set of a plurality of feature sets comprising resources configured with a system-of-chip (SOC) based on at least one SKU license code which has been decrypted using the at least one built-in key and validated by the firmware.

Clause 11. The non-transitory computer-readable medium of clause 10, the operations further comprising authenticating an advanced reduced instruction set computer (RISC) machine (ARM) using the at least one built-in key obtained from the secured storage.

Clause 12. The non-transitory computer-readable medium of clause 10, the operations further comprising periodic monitoring of at least one component of performance of the at least one feature set enabled to authenticate use of the SOC based on the at least one SKU license code.

Clause 13. The non-transitory computer-readable medium of clause 10, wherein the at least one built-in key is configured by at least one electrical programmable fuse (eFuse) during a manufacture of the device.

Clause 14. The non-transitory computer-readable medium of clause 10, wherein the secure storage comprises a System-on-Chip (SoC) electrical programmable fuse (eFuse).

Clause 15. The non-transitory computer-readable medium of clause 10, wherein the at least one built-in key is secured within the secure storage at a time of manufacture.

Clause 16. The non-transitory computer-readable medium of clause 10, wherein the at least one SKU license code enables at least one frequency of a set of frequencies for operating the SOC.

Clause 17. The non-transitory computer-readable medium of clause 10, wherein the at least one SKU license code enables at least one port of a set of ports for operating the SOC.

Clause 18. A computing device comprising: a processor: and a non-transitory computer-readable media storing instructions comprising Root of Trust (RoT) code that, when executed by the processor, causes the processor to perform operations comprising: decrypting a Stock Keeping Unit (SKU) license code from a host during bootup of a device: validating the SKU license code using firmware with at least one built-in key of a plurality of built-in keys stored at a secure storage: and enabling or disabling at least one feature set of a plurality of feature sets comprising resources configured at a system-of-chip (SOC) based on at least one SKU license code which has been decrypted using the at least one built-in key and validated by the firmware.

Clause 19. The computing device of clause 18, the operations further comprising: periodically or continually monitoring at least one component of performance of the at least one feature set enabled to authenticate use of the SOC based on the at least one SKU license code.

Clause 20. The computing device of clause 18, wherein the at least one SKU license code enables at least one frequency of a set of frequencies for operating the SOC, and wherein the at least one SKU license code enables at least one port of a set of ports for operating the SOC.

While the present systems and methods are described with respect to the specific examples, it is to be understood that the scope of the present systems and methods is not limited to these specific examples. Since other modifications and changes varied to fit particular operating requirements and environments will be apparent to those skilled in the art, the present systems and methods are not considered limited to the example chosen for purposes of disclosure and cover all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method of operating a system-on-chip (SOC), comprising:
    decrypting, by isolated Root of Trust (RoT) code, a Stock Keeping Unit (SKU) license code from a host during bootup of a device;
    validating, by the isolated ROT code, the SKU license code with firmware and at least one built-in key of a plurality of built-in keys from a secure storage; and
    enabling or disabling, by the isolated ROT code, at least one feature set of a plurality of feature sets comprising resources configured at the SOC based on at least one SKU license code which has been decrypted by isolated RoT code using at least one built-in key and authenticated by firmware wherein enabling or disabling of at least one feature set is on-demand and configured at the SOC, based on the at least one SKU license code decrypted by the isolated ROT code, for at least one port or speed for the device; and
    monitoring, by the isolated ROT code, at least one component of performance of at least one feature set enabled to authenticate use of the SOC based on the at least one SKU license code.

2. The method of claim 1, wherein the at least one built-in key is configured by at least one electrical programmable fuse (eFuse) during a manufacture of the device.

3. The method of claim 1, wherein the at least one built-in key is based on at least one electrical programmable fuse (eFuse) to at least disable one feature set of the SOC of the device.

4. The method of claim 1, wherein the at least one SKU license code enables at least one frequency of a set of frequencies for operating the SOC.

5. The method of claim 1, wherein the at least one SKU license code enables at least one port of a set of ports for operating the SOC.

6. The method of claim 1, wherein the at least one SKU license code is locally encrypted and stored, and readable by the isolated ROT code with firmware stored in flash memory.

7. The method of claim 1, wherein the secured storage comprises a fuse box of encrypted built-in keys in which each built-in key has been configured by at least one electrical programmable fuse (eFuse) burnt in a manner to at least disable one or more features of the SOC.

8. A non-transitory computer-readable medium comprising an isolated Root of Trust (RoT) code storing instructions that, when executed, cause a processor to perform operations, comprising:
    decrypting a Stock Keeping Unit (SKU) license code from a host during bootup of a device;
    validating the SKU license code using firmware with at least one built-in key of a plurality of built-in keys stored at a secure storage;
    enabling or disabling at least one feature set of a plurality of feature sets comprising resources configured with a system-of-chip (SOC) based on at least one SKU license code which has been decrypted using the at least one built-in key and validated by the firmware;

enabling or disabling at least one feature set on-demand and configured at the SOC, based on the at least one SKU license code decrypted by the isolated ROT code, for at least one port or speed for the device; and monitoring of at least one component of performance of the at least one feature set enabled to authenticate use of the SOC based on the at least one SKU license code.

9. The non-transitory computer-readable medium of claim 8, the operations further comprising authenticating an advanced reduced instruction set computer (RISC) machine (ARM) using the at least one built-in key obtained from the secured storage.

10. The non-transitory computer-readable medium of claim 8, wherein the monitoring further comprising periodic monitoring of at least one component of performance of the at least one feature set enabled to authenticate use of the SOC based on the at least one SKU license code.

11. The non-transitory computer-readable medium of claim 8, wherein the at least one built-in key is configured by at least one electrical programmable fuse (eFuse) during a manufacture of the device.

12. The non-transitory computer-readable medium of claim 8, wherein the secure storage comprises a System-on-Chip (SoC) electrical programmable fuse (eFuse).

13. The non-transitory computer-readable medium of claim 8, wherein the at least one built-in key is secured within the secure storage at a time of manufacture.

14. The non-transitory computer-readable medium of claim 8, wherein the at least one SKU license code enables at least one frequency of a set of frequencies for operating the SOC.

15. The non-transitory computer-readable medium of claim 8, wherein the at least one SKU license code enables at least one port of a set of ports for operating the SOC.

16. A computing device comprising:
a processor; and
a non-transitory computer-readable media storing instructions comprising Root of Trust (RoT) code that, when executed by the processor, causes the processor to perform operations comprising:

decrypting a Stock Keeping Unit (SKU) license code from a host during bootup of a device;

validating the SKU license code using firmware with at least one built-in key of a plurality of built-in keys stored at a secure storage;

enabling or disabling at least one feature set of a plurality of feature sets comprising resources configured at a system-of-chip (SOC) based on at least one SKU license code which has been decrypted using the at least one built-in key and validated by the firmware;

enabling or disabling at least one feature set on-demand and configured at the SOC, based on the at least one SKU license code decrypted by an isolated ROT code, for at least one port or speed for the device; and monitoring at least one component of performance of the at least one feature set enabled to authenticate use of the SOC based on the at least one SKU license code.

17. The computing device of claim 16, wherein the monitoring further comprising:

periodically or continually monitoring at least one component of performance of the at least one feature set enabled to authenticate use of the SOC based on the at least one SKU license code.

18. The computing device of claim 16, wherein the at least one SKU license code enables at least one frequency of a set of frequencies for operating the SOC, and wherein the at least one SKU license code enables at least one port of a set of ports for operating the SOC.

19. The computing device of claim 16, wherein the at least one built-in key is secured within the secure storage at a time of manufacture.

* * * * *